United States Patent
Steen et al.

(10) Patent No.: US 10,117,416 B2
(45) Date of Patent: Nov. 6, 2018

(54) VEHICLE FOR DISPLACING FEED LYING ON A FLOOR IN A SIDEWARD DISPLACEMENT DIRECTION

(71) Applicant: LELY PATENT N.V., Maassluis (NL)

(72) Inventors: Geert Cornelis Steen, Maassluis (NL); Heine Stegink, Maassluis (NL)

(73) Assignee: LELY PATENT N.V., Maassluis (NL)

( * ) Notice: Subject to any disclaimer, the term of this patent is extended or adjusted under 35 U.S.C. 154(b) by 331 days.

(21) Appl. No.: 14/771,073

(22) PCT Filed: Jan. 31, 2014

(86) PCT No.: PCT/NL2014/050056
§ 371 (c)(1),
(2) Date: Aug. 27, 2015

(87) PCT Pub. No.: WO2014/148889
PCT Pub. Date: Sep. 25, 2014

(65) Prior Publication Data
US 2016/0000035 A1    Jan. 7, 2016

(30) Foreign Application Priority Data
Mar. 21, 2013    (NL) ...................................... 2010499

(51) Int. Cl.
*A01K 5/02*    (2006.01)
*A01K 1/01*    (2006.01)
(Continued)

(52) U.S. Cl.
CPC .................. *A01K 5/02* (2013.01); *A01K 1/01* (2013.01); *A01K 1/0128* (2013.01); *A01K 1/105* (2013.01); *A01K 5/0266* (2013.01); *G05D 1/0088* (2013.01)

(58) Field of Classification Search
CPC ........ A01K 1/105; A01K 5/02; A01K 5/0266; B60C 11/0311; B60C 11/0316
(Continued)

(56) References Cited

U.S. PATENT DOCUMENTS 2,966,256 A    12/1960    Mcleland
3,273,038 A    9/1966    Miller
(Continued)

FOREIGN PATENT DOCUMENTS

AT    006016 U1    3/2003
DE    1109441 B    6/1961
(Continued)

*Primary Examiner* — Trinh T Nguyen
(74) *Attorney, Agent, or Firm* — Birch, Stewart, Kolasch & Birch, LLP

(57) ABSTRACT

A vehicle for displacing feed includes a frame with wheels having a plurality of elongate tread portions and grooves, a motor for moving the vehicle in a moving direction, and a material displacer to displace the material, when the vehicle moves in the moving direction, over the floor towards a first side with respect to said moving direction. At least a majority of the tread portions is arranged such that they extend, when in contact with the floor, in a direction that makes a sharp angle with the forward direction opposite said first side. Thus, diagonal tread portions are predominantly directed to one side to counteract a reaction force of the feed being displaced sidewardly by the vehicle.

20 Claims, 7 Drawing Sheets

US 10,117,416 B2
Page 2

(51) Int. Cl.
*A01K 1/10* (2006.01)
*G05D 1/00* (2006.01)

(58) Field of Classification Search
USPC .................................. 119/57.91, 57.92, 57.1
See application file for complete search history.

(56) References Cited

U.S. PATENT DOCUMENTS

| | | | |
|---|---|---|---|
| 4,119,900 | A | 10/1978 | Kremnitz |
| 5,109,566 | A | 5/1992 | Kobayashi et al. |
| 5,309,592 | A | 5/1994 | Hiratsuka |
| 5,341,540 | A | 8/1994 | Soupert et al. |
| 5,646,494 | A | 7/1997 | Han |
| 5,816,192 | A * | 10/1998 | van der Lely ............ A01K 5/00 119/57.92 |
| 2002/0130207 | A1* | 9/2002 | Berg ...................... A01K 1/015 239/654 |
| 2007/0227455 | A1* | 10/2007 | Sumiya ................. A01K 1/105 119/57.92 |
| 2008/0236509 | A1* | 10/2008 | Van Den Berg ..... A01K 5/0266 119/475 |
| 2009/0069968 | A1 | 3/2009 | Van Den Berg |
| 2010/0006034 | A1* | 1/2010 | Van Den Berg ......... A01K 5/02 119/14.18 |
| 2010/0230183 | A1* | 9/2010 | Van Den Berg ....... A01K 1/105 180/6.48 |
| 2010/0326363 | A1* | 12/2010 | Van Den Berg ....... A01K 1/105 119/57.92 |
| 2011/0185975 | A1* | 8/2011 | Van Den Berg ......... A01K 1/01 119/57.92 |
| 2013/0073137 | A1* | 3/2013 | Van Den Berg ....... G05D 1/021 701/23 |
| 2014/0034750 | A1* | 2/2014 | Van Kuilenburg .... A01K 1/105 239/71 |
| 2014/0117110 | A1* | 5/2014 | Pastoor ................. A01K 1/105 239/147 |
| 2014/0230737 | A1* | 8/2014 | Hendricus .............. A01K 5/004 119/57.92 |

FOREIGN PATENT DOCUMENTS

| | | |
|---|---|---|
| DE | 1183301 B | 12/1964 |
| DE | 4425924 A1 | 1/1996 |
| DE | 4444508 C1 | 2/1996 |
| DE | 299 04 151 U1 | 5/1999 |
| EP | 0142594 A1 | 5/1985 |
| EP | 0382693 A1 | 8/1990 |
| EP | 0943235 A2 | 9/1999 |
| EP | 1369010 A1 | 12/2003 |
| EP | 1369012 A1 | 12/2003 |
| EP | 1369017 A1 | 12/2003 |
| EP | 2 007 191 B1 | 9/2009 |
| FR | 2157211 * | 6/1973 |
| GB | 2313190 A | 11/1997 |
| GB | 2313191 A | 11/1997 |
| NL | 7416427 A | 6/1975 |
| NL | 1031605 C2 | 12/2007 |
| NL | 1034771 C2 | 8/2009 |

* cited by examiner

VEHICLE FOR DISPLACING FEED LYING ON A FLOOR IN A SIDEWARD DISPLACEMENT DIRECTION

TECHNICAL FIELD

The invention relates to a vehicle for displacing feed lying on a floor in a sideward displacement direction.

PRIOR ART

Such vehicles are known. For example, a vehicle for cleaning a stable floor is described in EP-A-0 943 235. Furthermore, Austrian Gebrauchsmuster AT-6016-U discloses a device that is movable along a guide means for displacing feed substantially transverse to the direction of travel.

Also known are vehicles that distribute feed and simultaneously displace feed substantially transversely to the direction of travel. EP2007191 describes a vehicle that is capable, without guide means, of displacing feed substantially transversely to the direction of travel.

In the context of the present invention, the term sideward or transverse is used to indicate that the feed is moved in a direction mainly transverse/perpendicular to the direction of movement of the vehicle. The next movement of feed may be in a diagonal forward direction with respect to the direction of movement of the vehicle, but the intended displacement direction should not be along the direction of travel of the vehicle, but to a sideward or transverse direction.

A problem with the known devices is that often the displacement of feed or other material and/or the vehicle navigation is deteriorated.

BRIEF DESCRIPTION

It is an object to provide a vehicle, in particular a vehicle according to the preamble of claim 1, with an improved material displacement and/or navigation capability.

This object is achieved by a vehicle according to claim 1, in particular a vehicle for displacing material such as feed, comprising a frame with a plurality of wheels having a tread pattern with a plurality of elongate tread portions and grooves, a motor device operably coupled to at least one of the wheels for moving the vehicle over a floor in a moving direction, a material displacer coupled to the frame, and arranged to displace the material, when the vehicle moves in the moving direction, over the floor towards a first side with respect to said moving direction, wherein at least a majority of the tread portions of all wheels combined is arranged such that they extend, when and at least for the part in contact with the floor, in a direction that makes a sharp angle with the forward direction opposite said first side.

It was found that with such a vehicle, both navigation precision and e.g. feed displacement capability improved. Without the applicant wishing to be tied to an explanation, it is believed that the total grip of the vehicle is increased by the tread as described. It is noted that material such as feed displaced will exert a reaction force on the vehicle. Since the feed is displaced towards a side of the vehicle, the reaction force will be directed from that side, which force has to be compensated by the frictional force from the wheels, i.e. the treads. In principle, there will also be a reaction force aimed in the direction of movement, in particular forwardly. Therefore, the total reaction force will often make an obtuse angle with the forward direction. This force can be compared to forces to be exerted by a car's wheel/tread in a curve, but it is usually an undesired force which is tried to be minimized or cancelled, mostly by providing a tread pattern that is mirror symmetrical in a vertical plane along the forward direction for either each tire, or at least for the car/vehicle as a whole. However, in the present invention, this reaction force is actually tried to be increased on purpose.

To improve a wheel's, or: a tread's, ability to compensate such a force, the tread has been arranged as described in this invention. Upon moving of the vehicle in the moving direction, the tread patterns of the plurality of wheels, in interaction with the floor, together generate a force acting on the vehicle having a component in the direction of said sideward displacement direction, thus compensating offsets affecting navigation or displacement to a larger part than known vehicles.

In the present application, the tread portions may be linear, curvilinear as well as discontinuous. The tread portions extend along their direction of largest extent. For example an oblong tread portion, having a length and a width, extends along the direction of its length. The term "majority" means that, in the case of tread portions of substantially equal length, more than half of the relevant tread portions extend in the indicated direction, or quadrant, i.e. it is an absolute majority. Herein, the relevant tread portions are those that do not extend parallel to or perpendicular to the direction of movement. Since the exact directions of all tread portions, when in contact with the floor, need not be strictly the same, they may vary as long as that direction fulfills the requirement as described and claimed. If the tread portions are of unequal length, or of equal length for that matter, "majority" means that the sum of the individual lengths of all tread portions that extend in the indicated direction, or quadrant, is higher than the sum of the lengths of the tread portions extending in the direction, or quadrant, mirrored with respect to the moving direction. When looking in the moving direction, more tread portion imprints will point away from the first side of the moving direction, i.e. the side towards which the material is displaced, than will point towards that first side. This will ensure that a larger force can be exerted to compensate the reaction force from the material displaced. Importantly, the mirror symmetry of the tread pattern as imprinted on the floor is broken in the present invention. Herein, it is important to realise that the displacing of the material is intended to be to one side. In cases where there is an equal probability for the material to be displaced to either of two opposite sides, it is not advantageous to select a first side with a main orientation for the tread portions. However, in the present invention, there is a single main side for displacement of the material, and thus the possibility to select a tread design that is asymmetrical for all of the vehicle. Note that it is believed that a design that is asymmetrical for an individual wheel, but mirror symmetrical (of course in a plane along the moving direction) for the vehicle as a whole would still not lead to the advantage of the present invention. Contrarily, the design for all wheels combined, i.e. for all treads as a whole, should be arranged according to the present invention.

Herein, as in all of the application, the only tread portions considered are those that come into contact with the floor during normal rolling of the wheel(s), and they are sometimes called the "relevant" tread portions herein. Any tread part on a rim of a curved outer wheel surface, that does not come in contact with the floor, does not count in this invention as a tread portion. Furthermore, the term wheel includes the combination of a, mostly metal, rimmed true wheel and a tire, as well as wheel that is a unitary piece of material.

Advantages and preferred embodiments will be described in the dependent claims, as well as in what follows.

For example, the sharp angle mentioned above is advantageously between 45 and 90°, preferably between 45 and 75°, most preferably about 60°, i.e. ±5°. It has been found that with such angles, a good balance is struck between grip in the forward, moving direction and resisting sideward displacement resulting from the reaction force by displaced material, i.e an improved navigation that requires less correction or resetting. Herein, the angle relates to the average angle of the relevant tread portions, wherein "average" relates to the direction of largest extent. If for all of the relevant tread portions, i.e. 'slanted' or 'diagonal' in the indicated quadrant, this angle is the same, the angle is of course clear and unambiguous, but if this angle varies somewhat, "average" relates to the average angle of all relevant tread portions. Note that the tread pattern may comprise a number of different tread portions, including a mixture of axial, tangential (circumferential) and diagonal tread portions. However, the former two will not be considered further in the present invention.

The tread pattern may comprise a number of different tread portions, including a mixture of axial, tangential and diagonal tread portions, but may also comprise only diagonal tread portions. In particular embodiments, the tread portions comprise or consist of mutually parallel tread portions. This ensures that the behaviour of the wheel, such as relating to grip, can be made sufficiently constant. Advantageously, for all of the circumference of the wheel, at least three tread portions, that are separated by a groove, are in contact with the floor. More in particular the tread portions comprise straight, linear tread portions, and even more in particular consist of straight, linear tread portions. This ensures even better the constant behaviour as to grip etc., which is advantageous in respect of navigational accuracy.

In some vehicles according to the present invention, the tread portions, and in particular each one thereof, extend over the entire width of the tread, more in particular of the wheel. This ensures that the tread, i.e. outer surface of the wheel that is in contact with the floor, has a grip providing tread portion that is as constant as possible. A very simple and robust embodiment therefore has a tread surface consisting of parallel lugs and grooves, each extending all across the tread from one shoulder to the other. An even simpler version consisting of a wheel with a solid outer layer having the above tread pattern, that is simply a cylindrical portion cut straight off a (much) longer cylinder having such a pattern of lugs and grooves. According to an embodiment the plurality of wheels comprise an outer layer formed of a solid, flexible material, for instance polyurethane (PUR) wherein or whereon the tread pattern is formed. Providing a solid outer layer of a flexible material, allows for substantial deformation of the outer layer due to contact with the floor, which in combination with the tread pattern can generate a force acting on the vehicle having a component in the direction of the sideward displacement direction. This will be explained in more detail below. According to an embodiment, the wheel comprises a non-pneumatic tire.

In embodiments, the grooved tread portions have a depth (d) and the raised tread portions have a width (w), wherein the width (w) is smaller than 3 times the depth (d), preferably smaller than 2 times the depth (d). In an embodiment, the width and the depth are substantially equal to each other. In a further embodiment, the width is smaller than the depth.

Such dimensions allow the raised tread portions to deform in a direction perpendicular to the diagonal direction of the tread portions, thereby generating a force having a component in the direction of said sideward displacement direction.

With certain vehicle according to the invention, at least two, and preferably all, of the plurality of wheels have a mutually translationally identical tread pattern. As was already indicated above, it is the total tread of all the wheels combined that determines the behaviour of the vehicle. Then, the wheels all comprise an identical tread pattern. And still only one type of wheel is needed, thus keeping stock to a minimum.

It will be understood that there may be wheels present on the vehicle with a tread pattern that doesn't substantially contribute to the a sideward force, in particular those with a wheel-wise mirrorsymmetrical tread pattern. Also, there even may be wheels present on the vehicle with a tread pattern that on its own generate a force in the opposite direction, i.e. away from the (sideward) displacement direction, as long as the plurality of wheels together, in particular the mentioned and claimed majority of the relevant tread portions, result in a force having a component in the direction of the sideward displacement direction. There may also be wheels provided without a tread pattern, such as "slicks". However, in particular in a barn environment, this is not advantageous with respect to grip and navigational accuracy.

The vehicle is not particularly limited, and may relate to an operator controlled vehicle. An advantage here would still be that that operator need perform fewer and smaller navigational corrections. However, advantageously, the vehicle is an autonomous unmanned vehicle. For such vehicles, having good grip will also result in good navigation accuracy. For navigation systems that use counting revolutions of one or more wheels, this will be obvious. But even for wheel-independent navigation systems, fewer corrections will be required, which will make the system faster and still more accurate, or at least simpler, as it either needs fewer calibration moments or beacons and/or less time and energy to perform corrections in the path. In particular, the vehicle comprises a navigation system arranged to count a number of revolutions of at least one of the wheels and to measure a steering direction of the vehicle, and that is arranged to navigate the vehicle based on said number and said steering direction. However, other navigation systems such as floor-strip followers, ultrasound or gps based systems are not excluded, while for further details reference is made to the navigation systems known in the art.

Furthermore, the type of material displacer is not particularly limited, and could be a snow plough or street dirt displacer. Importantly, however, it should be a material displacer that is intended to displace the material substantially sidewardly in only one sideward direction, such as by a unidirectionally rotating brush or a simple slide. After all, if both sideward directions are (equally) possible, the advantage of compensation for a reaction force from a certain direction would be diminished (or lost). In most cases, a snow plough or street dirt displacer displaces the snow, the street dirt respectively, to one side, viz. to the right in lefthand-drive countries, and vice versa.

In some other advantageous embodiments, the material displacer comprises feed displacing means for displacing feed substantially sidewardly, in particular a feed slide. Herein, it is noted that such feed displacers are used primarily along feed fences or other feeding places. Although the direction of displacing the feed is not particularly limited, it is easy to limit is to one direction, if need be adapting the route to be followed by the vehicle. In a particularly advantageous embodiment, the feed displacer comprises a circular element freely rotatable for frictional drive with the ground and/or the feed, such as more in particular used in the Lely Juno™ or the Lely Vector™. The latter systems use a more or less frustroconical skirt or sleeve, that rotates when in contact with feed, or with the ground, to thereby push feed to one side, such as to the feed fence. More details are described in a.o. NL-1031605 and NL-1034771.

In embodiments, the vehicle according to the invention comprises two wheels that are separately drivable by separate drive means, a distance determining device for determining the distance from the vehicle to a wall portion, a torque difference adjusting device for adjusting the torque difference between the wheels, a control unit for controlling the vehicle and moving it in a direction of travel, or movement. These embodiments are suitable for following a wall, such as even a feed fence, in order to navigate. Further navigation details, such as what to do when a wall ends, can be entered in the control unit. The control unit is programmed in such a way that during operation the vehicle will maintain a distance determined by the distance determining device to the wall portion, which distance is preferably fixed and greater than or equal to a predetermined minimum distance to the wall portion.

In such case, the two wheels that are separately drivable are non-swivel or non-steerable wheels. Rather, the steering may be brought about by having a difference in rotational speed. Additional wheels may be provided. However, alternative or additional steering means may be provided. According to an embodiment the vehicle comprises a further wheel. The further wheel may be positioned before or behind the wheels that are separately drivable by the separate drive means, at a lateral position in between these two wheels. The further wheel may be a swivel wheel or a steerable wheel.

The swivel-wheel may be driven or non-driven. The swivel wheel may be with or without tread pattern.

Alternatively, the vehicle may be provided with one or more steerable wheels and one or more non-swivel wheels (similar to a private car).

SHORT DESCRIPTION OF THE DRAWINGS

Embodiments will now be described, by way of example only, with reference to the accompanying schematic drawings in which corresponding reference symbols indicate corresponding parts, and in which.

DETAILED DESCRIPTION

Embodiments will be described with reference to the Figures.

First, with reference to FIGS. 1 and 2, an embodiment of a vehicle for displacing feed lying on a floor in a substantially sideward displacement direction with respect to a (forward) moving direction of the vehicle will be described. Of course, other types of vehicles for displacing feed lying on a floor in a substantially sideward displacement direction with respect to a (forward) moving direction of the vehicle are conceivable as well. The embodiments relate in particular to vehicles which are arranged to displace feed in one predetermined sideward displacement direction (left or right) with respect to a moving direction and not in two sideward displacement directions (left and right).

Figure 1:
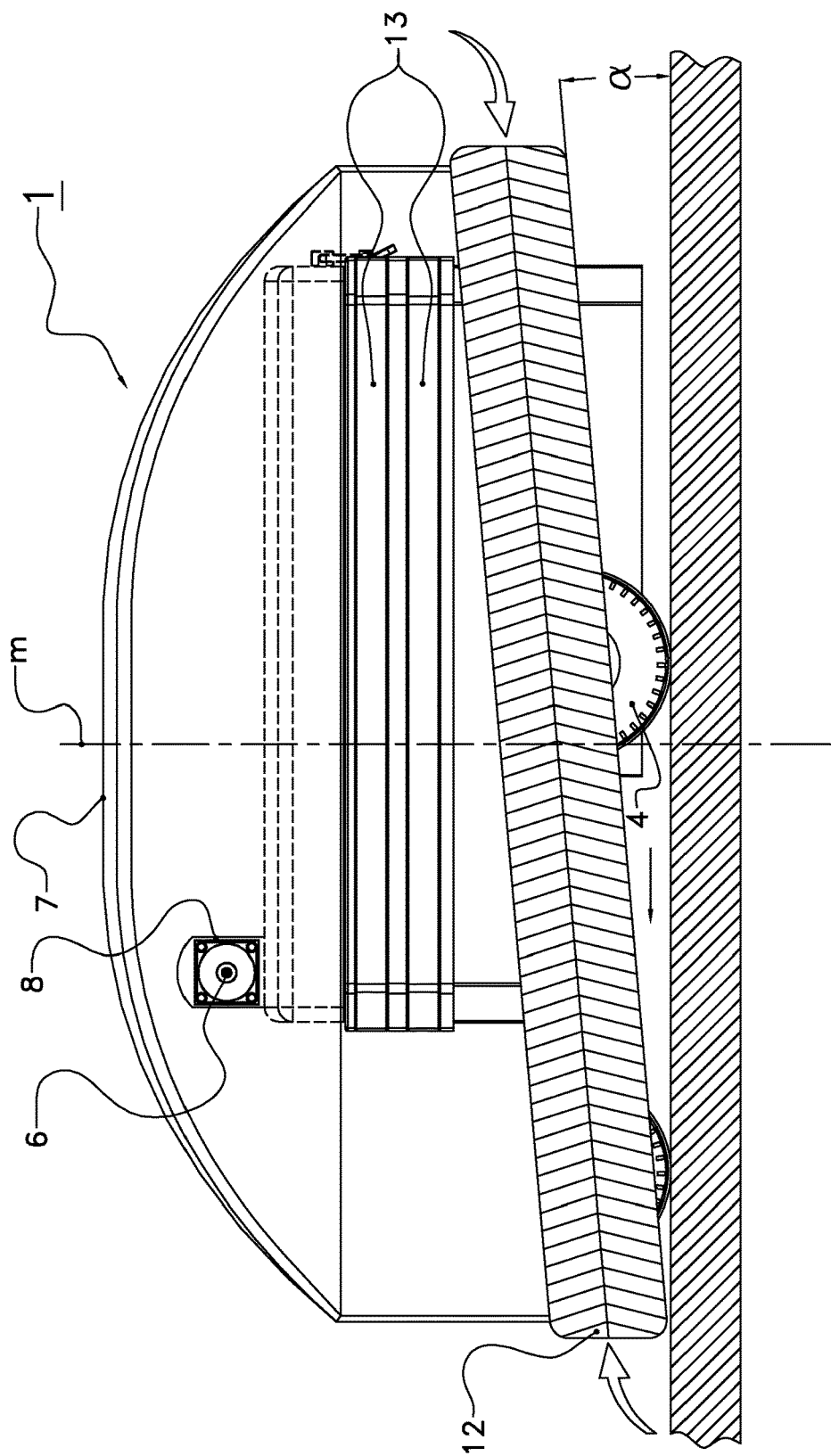
FIG. 1 is a schematic side view of the vehicle.
Figure 2:
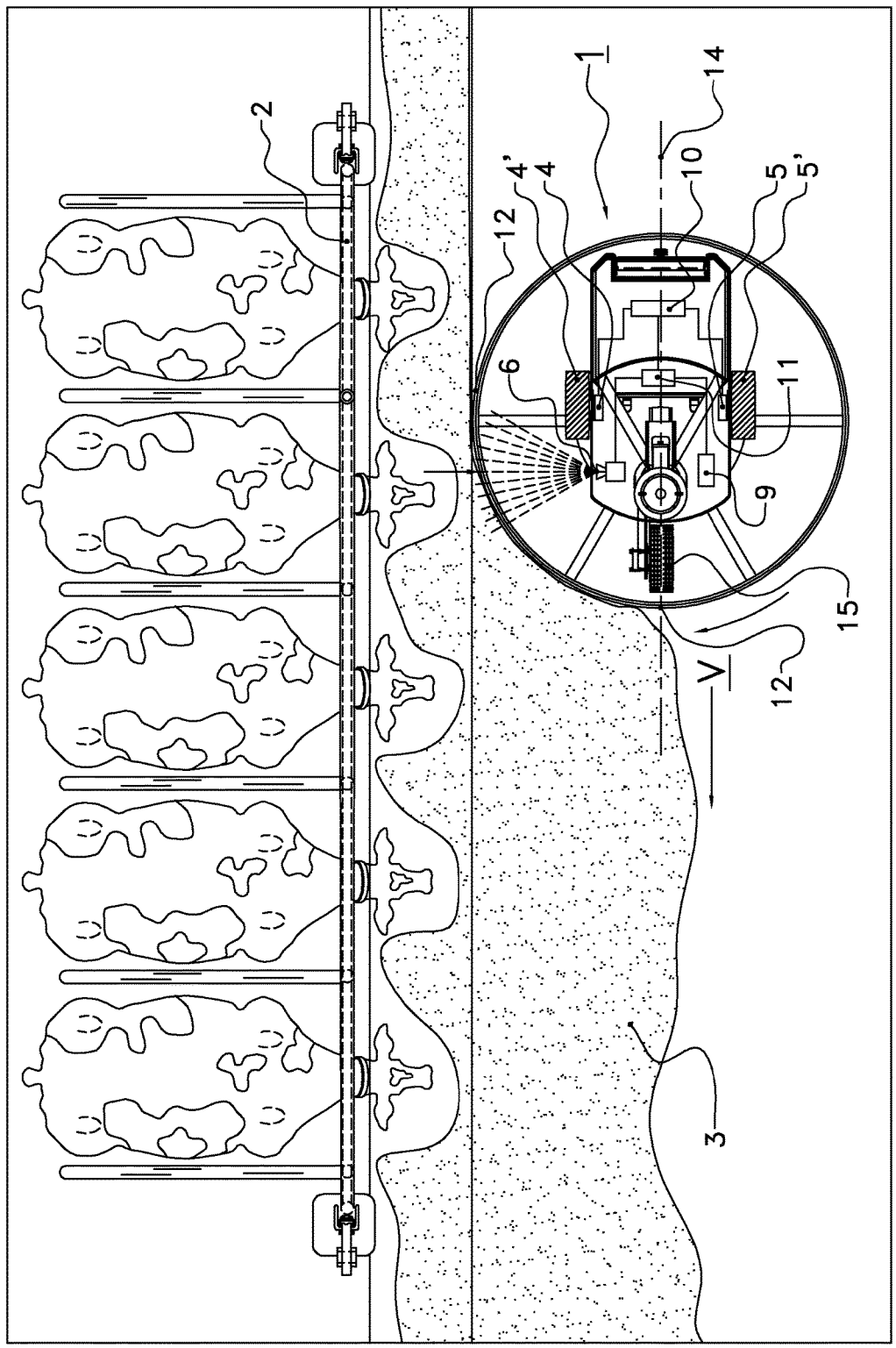
FIG. 2 is a schematic plan view of the unmanned vehicle according to an embodiment, and FIGS. 3a-3e schematically show a top view of vehicles according to different embodiments.

FIGS. 1 and 2 show an unmanned autonomous vehicle 1 for displacing feed 3 lying on a floor substantially sidewardly to a feeding gate 2. The feed 3, that may be solid, liquid or a mixture thereof, has been deposited at the feeding gate 2 in a manner known per se, for example with the aid of a tractor. It will be obvious that the present invention will also be applicable to other installations for supplying feed to animals, so that the feeding gate shown in FIG. 2 is only one of the many examples of a wall portion in the vicinity of which feed can be deposited.

The term "wall portion" refers to partition elements, either or not having an open structure, it being possible for the wall portion to assume many different, curved, rectilinear, angular, etc. shapes.

Autonomously movable vehicles for performing many different functions, as well as the control of such vehicles, are known per se and will therefore not be described here in detail. Automatic charging of the energy supply of the vehicle and automatic loading and unloading of other materials into and from, respectively, containers present on the vehicle, are known as well. It will suffice to refer to the following patent documents: U.S. Pat. No. 2,966,256, DE-1109441, DE-1183301, EP-0382693, DE-4425924, U.S. Pat. No. 5,309,592, EP-0142594, DE-4444508, GB-2313190, U.S. Pat. No. 5,109,566, GB-2313191, U.S. Pat. No. 3,273,038, NL-7416427, U.S. Pat. No. 5,341,540, U.S. Pat. No. 5,646,494, EP-0943235, EP-1369010, EP-1369012 and EP-1369017.

The vehicle 1 comprises two wheels 4', 5' that are separately drivable by separate drive means 4, 5. The vehicle 1 is further provided with a distance determining device 6, in the embodiment shown an ultrasonic sensor, for determining the distance from the vehicle 1 to the feeding gate 2. It will be obvious that all sensors known in the technique, such as for example the sensors mentioned in the patent documents enumerated above, can be used for the purpose of distance determination. The unmanned vehicle 1 can be provided with an external, protective covering 7 provided with apertures 8, so that the ultrasonic sensor 6 is enabled to detect the feeding gate 2.

The vehicle 1 as shown further comprises a front wheel 15. Front wheel 15 may be a swivel wheel.

In order to prevent material, such as feed and the like, from accumulating in the interior of the unmanned vehicle 1 via the apertures 8, the bottom of the unmanned vehicle 1 is at least partially open.

The unmanned vehicle 1 further comprises an orientation determining device 9, in the embodiment shown a gyroscope, for determining the orientation of the centre line 14 of the vehicle 1 relative to the feeding gate 2. It will be obvious that all sensors known in the technique, such as for example the sensors mentioned in the patent documents enumerated above, can be used for the purpose of orientation determination, such as an electronic compass or a camera with image recognition equipment.

The unmanned vehicle 1 is also provided with a torque difference determining device for determining the torque difference between the wheels 4', 5'. Such a torque difference determining device, which uses data from the drive means 4, 5, is known per se. Such a torque difference determining device can also be used for detecting skid of one of the wheels, after which detection it is possible to perform a correct action (such as reducing the number of revolutions per minute, alarming an operator).

The unmanned vehicle 1 is further provided with a control unit 11 for controlling the unmanned vehicle 1 and moving it in a direction of travel V, also referred to as a moving direction of forward moving direction. It is of course not excluded that the vehicle can be controlled to move in a rearward direction. From the positioning of the sensors and feed displacing means (described in more detail below), the moving direction V will be clear.

The control unit 11 is connected, via electric wires, or in a wireless manner if desired, with the distance determining device 6, the orientation determining device 9, the torque difference determining device 10, and the drives 4, 5 of the wheels 4', 5', for the purpose of exchanging data.

For displacing feed 3 substantially transverse to the direction of travel V of the unmanned vehicle, the unmanned vehicle 1 is provided with feed displacing means 12. Such feed displacing means can be constituted by e.g. an obliquely disposed slide, or by a conveyor belt. However, according to the embodiment shown, these feed displacing means 12 are preferably constituted by a freely rotatable circular element 12, whose outer circumference constitutes the outer circumference of the unmanned vehicle 1. When, during operation of the unmanned vehicle 1, the circular element 12, which may be for example a ring or a disc, comes into contact with the feed and/or floor, said element 12 is rotated automatically, in other words the circular element 12 is feed or floor driven.

An extremely reproducible displacement of the feed is obtained if the circular element 12 is tilted through an angle α in such a way that, at least almost in the direction of travel V of the vehicle 1, it is located closest to the floor. In dependence on the feed to be displaced, the angle α enclosed by the circular element 12 and the floor, can be adjustable. If desired, the angle α is adjustable, during operation of the vehicle 1, by tilting means known per se (not shown in the drawing), such as a cylinder, that are controlled by the control unit 11.

When the feed is deposited on the floor, and when the animals present at the feeding gate are eating the feed, the feed is accumulated over different distances to the feeding gate to different heights. In order that the animals are always able to reach in a simple manner a desired amount of feed it is ensured, by making the unmanned vehicle move regularly along the feeding gate 2, that feed is displaced to the feeding gate, as schematically shown in FIG. 2. In order that the unmanned vehicle 1 is correctly controlled, the control unit 11 is programmed in such a way that during operation the vehicle 1 will maintain a distance determined by the distance determining device 6 to the feeding gate 2, which distance is greater than or equal to a pre-determined minimum distance to the feeding gate, and that during operation the centre line 14 of the vehicle will maintain an orientation determined by the orientation determining device 9 relative to the feeding gate 2, which orientation is at least almost equal to a pre-determined orientation, and that during operation the drivable wheels 4', 5' of the unmanned vehicle 1 will show a torque difference determined by the torque difference determining device 10, which torque difference is smaller than or equal to a pre-determined maximum torque. This means that the unmanned vehicle will always maintain a correct orientation relative to the feeding gate 2, that the unmanned vehicle 1 will not come within the minimum distance to the feeding gate 2, and that it is ensured that the feed will not accumulate too much, because, in case of the unmanned vehicle 1 moving through a too large amount of feed, the torque difference would become too great.

The control unit 11 is programmed in such a way that, for controlling the unmanned vehicle 1, priority is given to the distance determined by the distance determining means 6 in combination with the pre-determined minimum distance.

The pre-determined distance may be adjustable during operation. The adjustment may, for example, depend on the point of time of the day, the period of time elapsed since the unmanned vehicle was present at the same position, the sort of animals or the individual animals present at the feeding gate. In a preferred embodiment of an unmanned vehicle, also the pre-determined maximum torque difference and/or the pre-determined orientation are/is adjustable during operation.

The unmanned autonomous vehicle 1 is provided with a (non-shown) energy supply that is chargeable via sidewardly disposed charging strips 13 that are capable of being brought into contact with a charging device. Other ways of charging the energy supply, such as inductive means, are mentioned inter alia in the abovementioned patent documents.

Although not shown in the figures, the unmanned vehicle 1 may additionally be adapted to supply feed. For this purpose, the unmanned vehicle 1 may be provided with a storage container for containing feed, and with a discharge device for discharging feed to the floor. The storage container is preferably provided with a mixing device for mixing feed. In this case it is advantageous if the control unit controls the operation of the discharge device on the basis of data from the distance determining device and/or the torque difference determining device and/or the speed of the vehicle and/or the weight decrease of the storage container. This enables inter alia the supply of a uniform amount of feed. When, for example, at a particular distance to the feeding gate the torque difference comes below a particular value (for example mentioned in a table stored in a memory of the control unit), the amount of feed has come below a particular value. On the basis of these data, the discharge device can deposit a particular amount of feed on that place of the floor. Alternatively or additionally, the unmanned vehicle 1 may be provided with a signaling device (for example a transmitting aerial with a suitable controlling transmission circuit) for supplying a signal (for example for drawing the attention of an owner and/or operator of the unmanned vehicle), the control unit controlling the operation of the signaling device on the basis of data from the distance determining device and/or the torque difference determining device. The invention is based on the insight that the magnitude of the torque difference depends on the amount of feed present on the floor through which the unmanned vehicle moves, and this torque difference can thus be used advantageously together with the determined distance and orientation for a correct control of the unmanned vehicle.

Figure 3A:
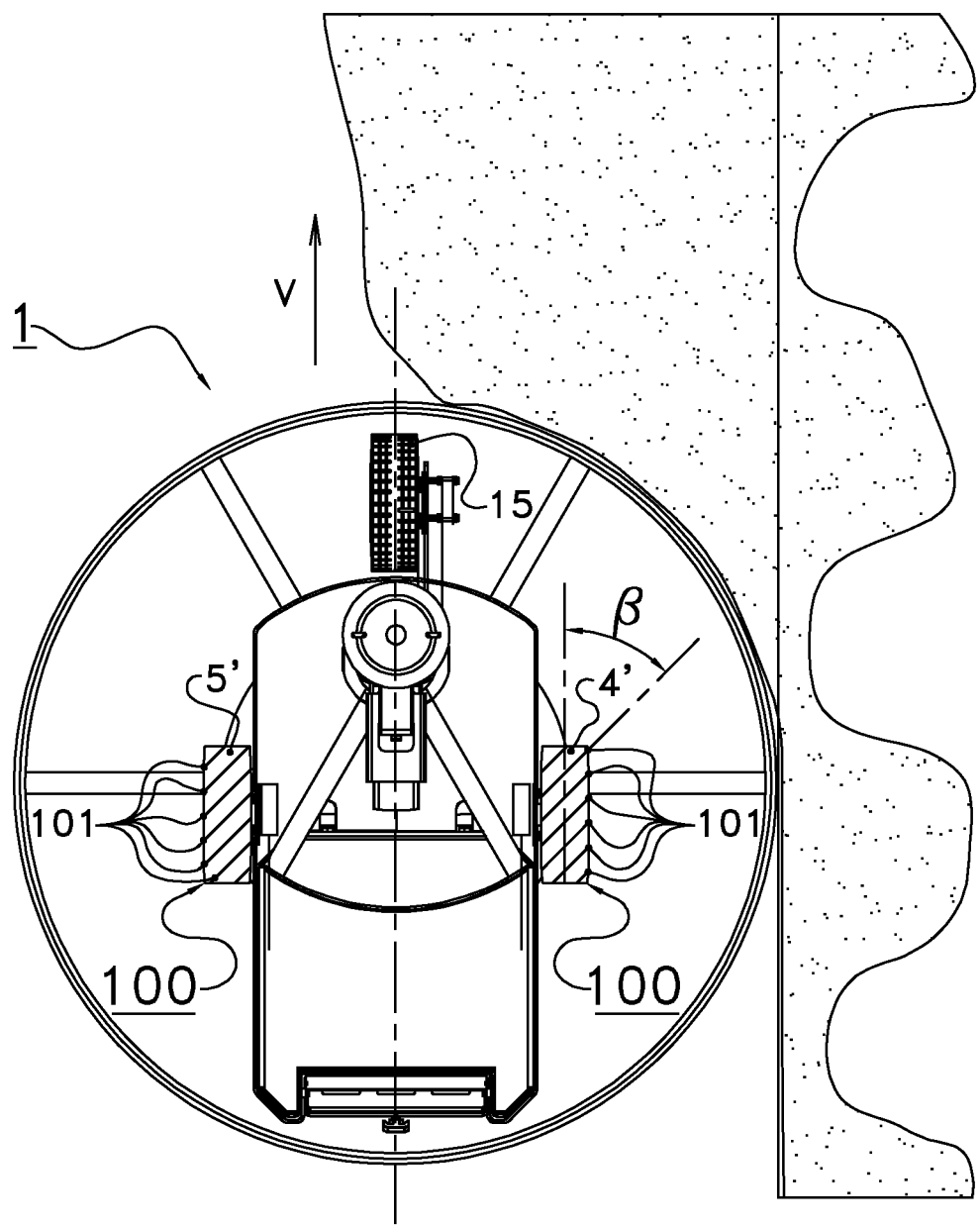

FIG. 2 and FIG. 3*a* show a top view of the vehicle 1 and therefore also show the upper parts of the wheels 4', 5'. As shown schematically, the outer circumference of the wheels 4', 5' are provided with tread portions 100 which comprise diagonal tread portions 101 directed to one side. It will be understood that the diagonal tread portions will be directed differently in the lower part of the wheels 4', 5'. Furthermore it is noted that the figures show the tread patterns schematically, not taking into account the curve of the wheel.

The diagonal tread portions 101 as shown in FIG. 3*a* have a direction of largest extent that subtends a sharp angle β with a plane that is perpendicular to an axis of rotation of the respective wheel. Angle β is preferably in the range of 35°-75°, for instance 60°.

Angle β is preferably chosen in relation to a width W of the wheel to ensure that along each cross-section of the wheel comprising the axis of rotation, at least two, but preferably at least three diagonal tread portions 101 are crossed. This it to ensure that there are always at least two or three diagonal tread portions 101 in contact with the floor.

The diagonal tread portions may be formed by grooved tread portions 101, leaving raised tread portions 102 in between the grooved tread portions 101. This has the effect that, upon moving of the vehicle 1 in the moving direction, the treads 100 of the plurality of wheels 4', 5' in interaction with the floor, together generate a force acting on the vehicle 1 having a component in the direction of said sideward displacement direction. In other words, the vehicle 1 is biased towards the feeding gate 2 or wall portion.

For instance, in case the vehicle is for displacing feed to the right of the vehicle with respect to the moving direction of the vehicle, the feed will exert a reaction force pushing the vehicle to the left. The diagonal tread portions are provided to cause a tread force being exerted on the vehicle to the right, thereby counteracting the reaction force of the feed.

FIG. 3*a* shows in more detail that two wheels 4', 5' are provided with diagonal tread portions 101, while a front wheel 15 is provided with a different tread not comprising diagonal tread portions and which will thus not substantially contribute to the component of the force acting on the vehicle 1 in the sideward displacement direction. Alternatively, the front wheel 15 may comprise diagonal tread portions as well, or may not comprise any tread pattern at all.

Also shown in the figures is that the diagonal tread portions 101 extend over the entire width of the wheel. Alternatively, the diagonal tread portions 101 may extend over only a part of the width of the wheel, for instance over the centre 80% of the width of the wheel.

More clearly indicated in FIGS. 3*b*-3*e* is a total resulting force $F_T$ exerted by the floor via the wheels on the vehicle 1, having a component in the sideward displacement direction, showing that upon moving of the vehicle 1 in the moving direction, the tread patterns 100 of the plurality of wheels 4', 5' in interaction with the floor, together generate a force acting on the vehicle 1 having a component in the direction of said sideward displacement direction.

Figure 3B:
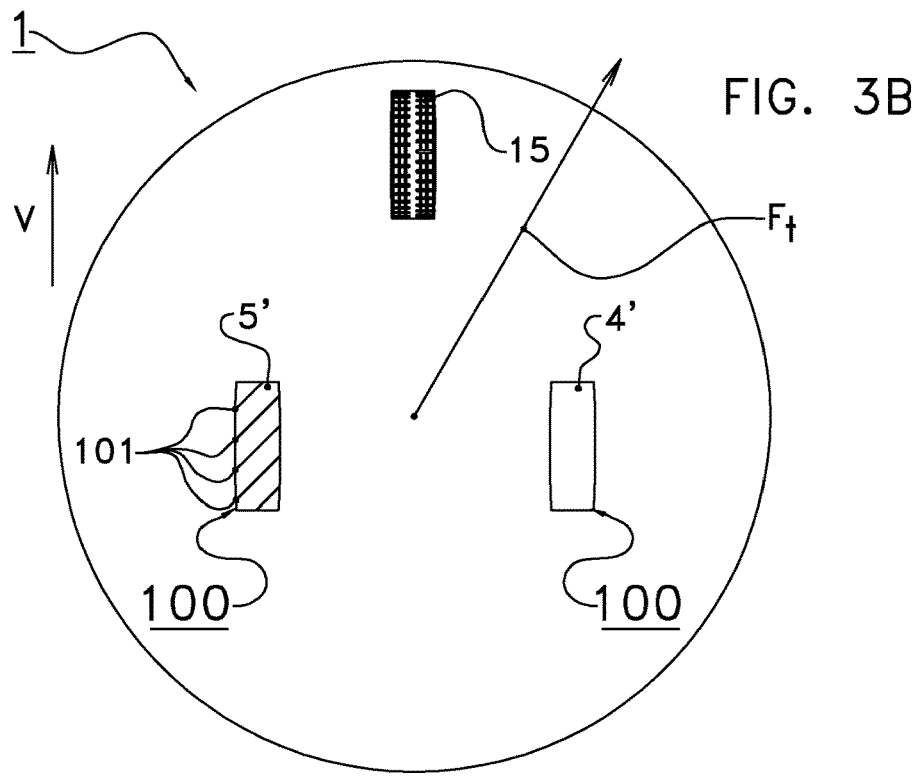

FIG. 3*b* shows an embodiment in which the vehicle 1 comprises a front wheel 15 without diagonal tread portions, one wheel 4' without a tread pattern and one wheel 5' with a tread pattern which, upon moving of the vehicle 1 in the moving direction, in interaction with the floor, generates a force acting on the vehicle 1 having a component in the direction of said sideward displacement direction.

Figure 3C:
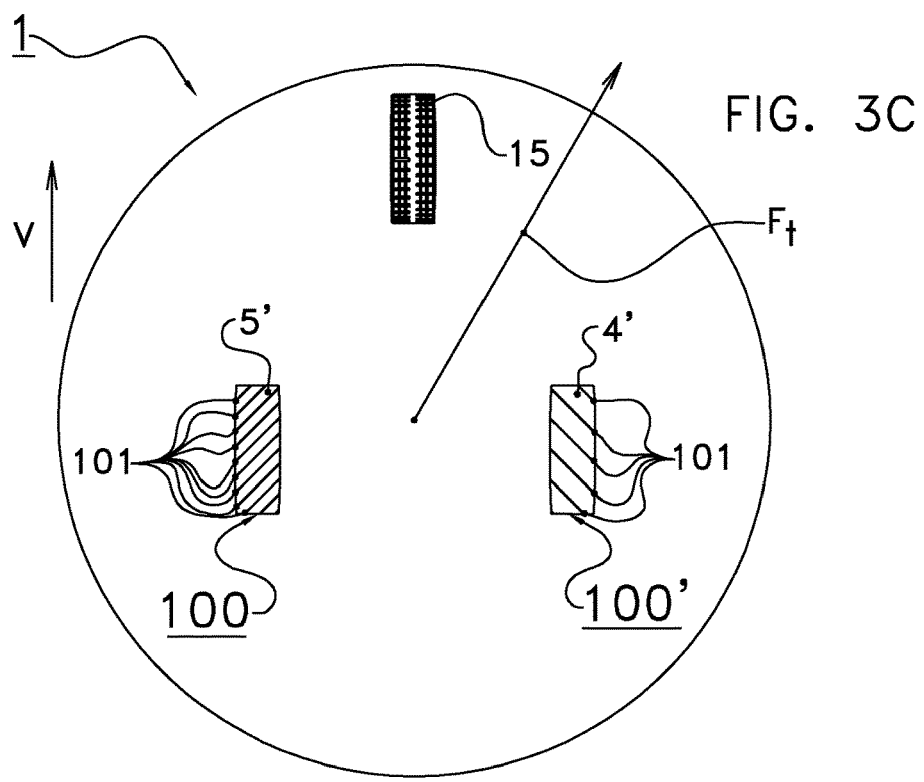

FIG. 3*c* shows an embodiment similar to FIG. 3*b*, with the difference that instead of one wheel 4' without a tread pattern, wheel 4' comprises a tread pattern which, upon moving of the vehicle 1 in the moving direction, in interaction with the floor, generates a force acting on the vehicle 1 having a component in a direction opposite of said sideward displacement direction.

However, as the tread pattern of wheel 4' is less dense than the tread of wheel 5', upon moving of the vehicle 1 in the moving direction, the tread pattern of the plurality of wheels 4', 5' in interaction with the floor, together generate a force acting on the vehicle 1 having a component in the direction of said sideward displacement direction.

Figure 3D:
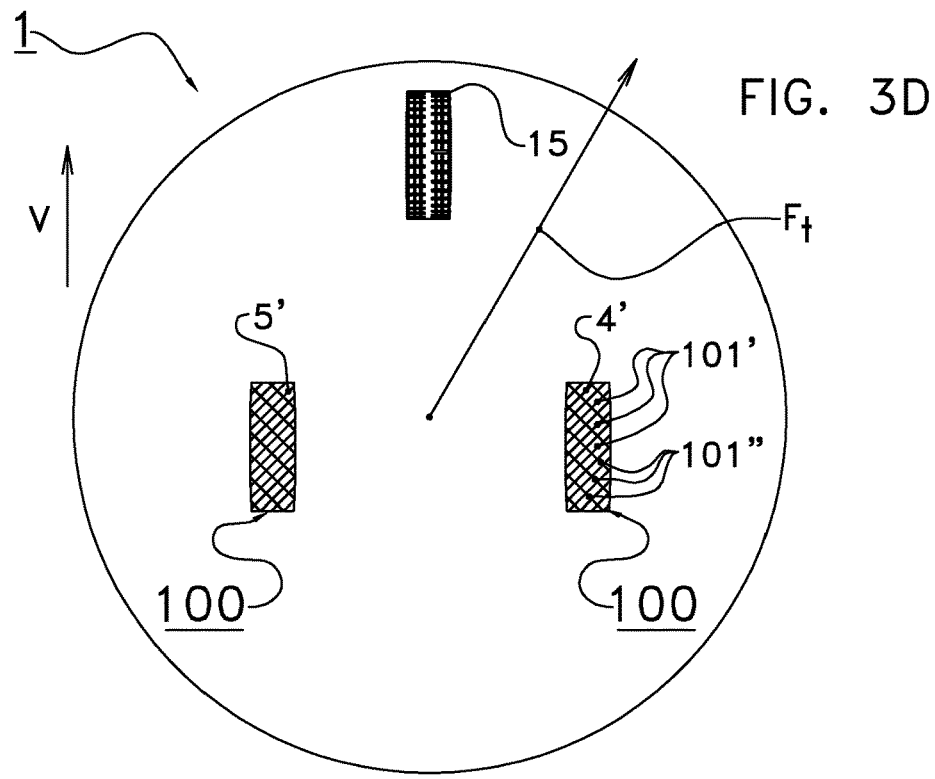

FIG. 3*d* shows a further alternative in which the diagonal tread portions comprise first diagonal tread portions 101' in a first diagonal direction and second diagonal tread portions 101" in a second diagonal direction, the first and second diagonal directions being opposite with respect to each other, wherein the number of first diagonal tread portions 101' exceeds the number of second diagonal tread portions 101".

The number of first diagonal tread portions may for instance be at least 50% higher, but preferably more than 100% higher than the number of second diagonal tread portions.

Figure 3E:
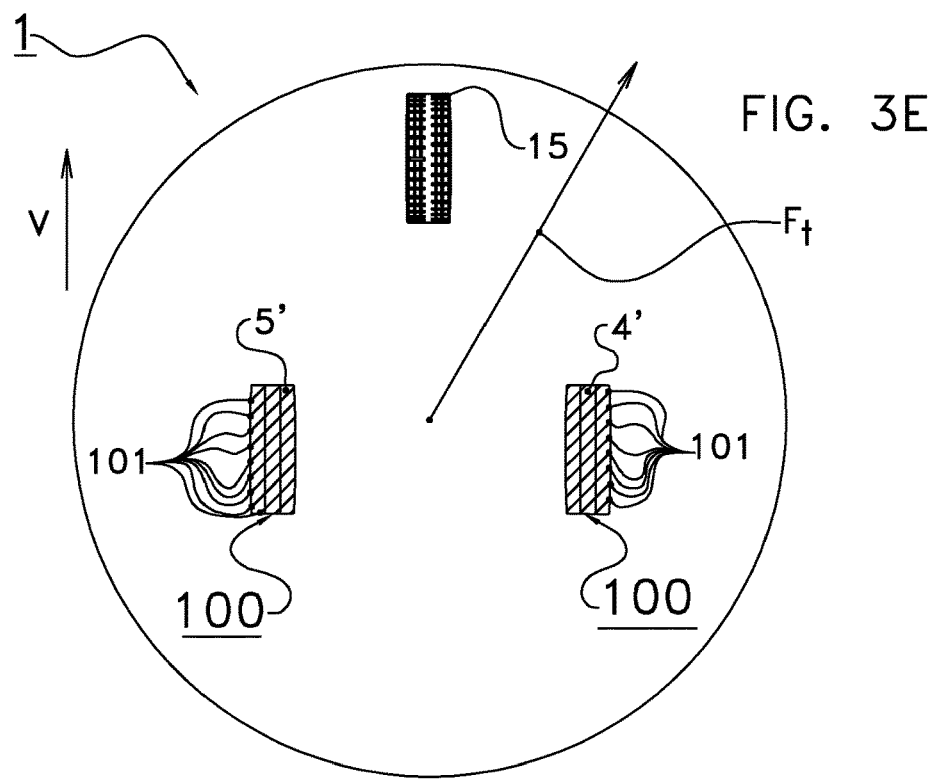

FIG. 3*e* further shows that the wheels comprising the diagonal tread portions may further comprise non-diagonal tread portions.

Figure 4:
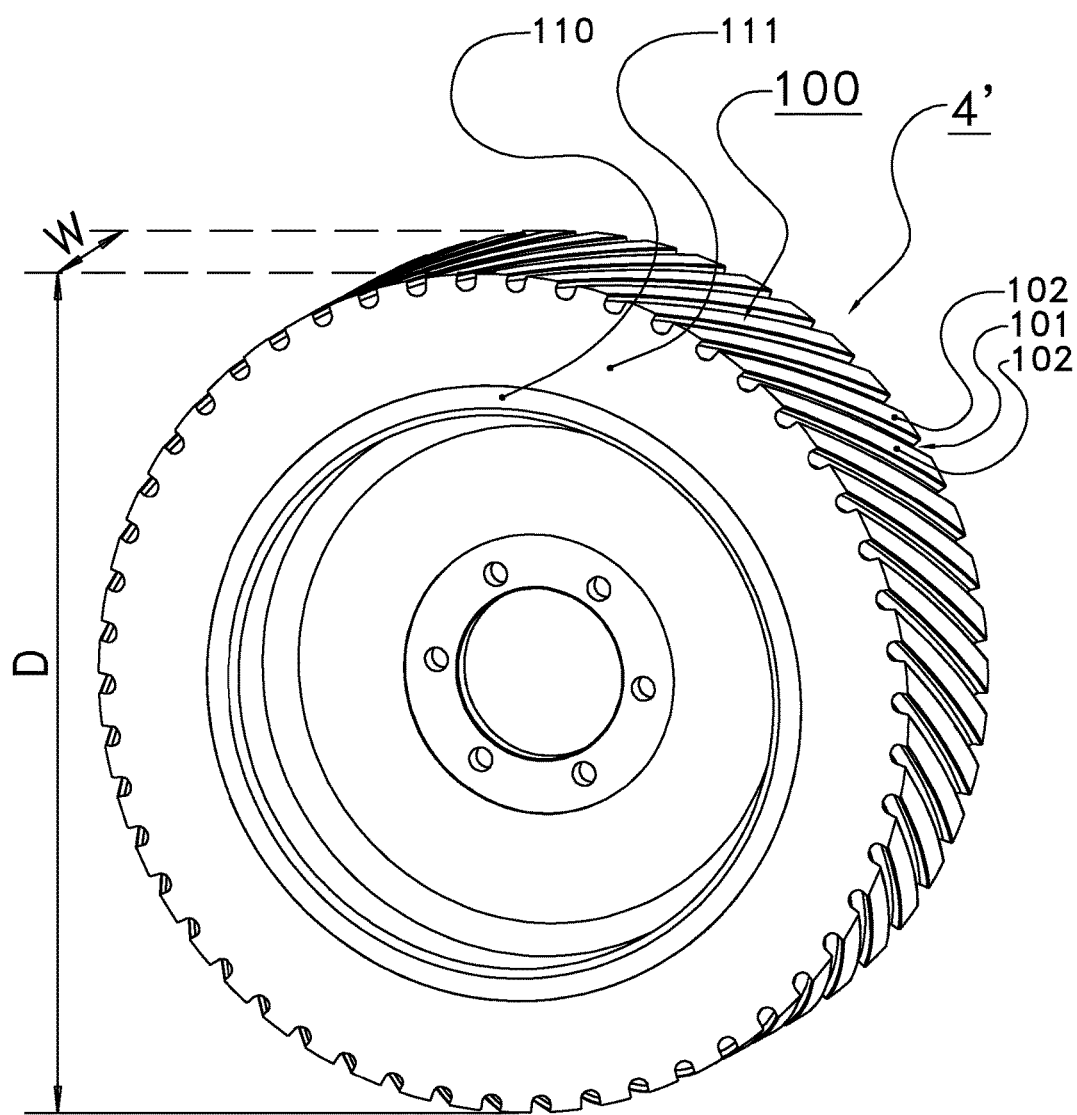
FIG. 4 shows a perspective view of a wheel.

FIG. 4 schematically shows a wheel which can advantageous be used in the embodiments described above. The wheel 4' shown has an outer circumferential surface that is provided with a tread pattern 100, such that upon moving of the vehicle 1 the tread patterns 100 of the wheels 4' in interaction with the floor, generates a force acting on the wheel 4' (and thus on the vehicle the wheel is attached to) having a component in a sideward direction.

The wheel has a diameter D and a width W. The diameter D may be 300 mm and the width W may be 90 mm.

The tread pattern 100 is formed by a plurality of diagonal grooved tread portions 101 extending over the entire width W of the outer circumferential surface of the wheel. In between the grooved tread portions 101 are diagonal raised tread portions 102 which also extend over the entire width W of the outer circumferential surface.

The wheel 4' is formed by a rim 110 on which a tire 111 is mounted. The tire is a solid tire 111, i.e. it is not pneumatic tire.

Figure 5:
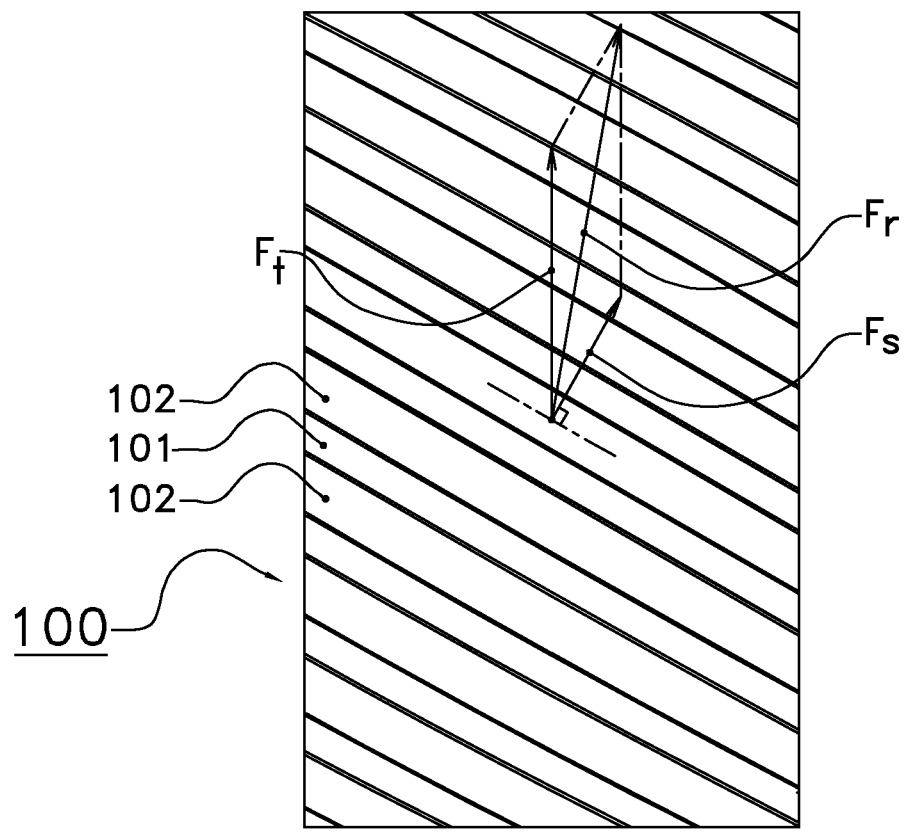
FIG. 5 shows the tread pattern of the wheel shown in FIG. 4 in an unrolled state.

FIG. 5 schematically shows the tread pattern 100 of the wheel 4' shown in FIG. 4 in an unrolled state, showing the alternating grooved tread portions 101 and raised tread portions 102. FIG. 5 is shown such that the figure also corresponds to a foot print of the wheel 4' seen from above.

Also depicted is a force $F_T$ (traction) which is generated when a part of a raised tread portion 102 is in contact with the floor as a result of the fact that the wheel 4' is driven. As a result, the raised tread portion 102 will deform as it has some flexibility, in particular in a direction perpendicular to the diagonal direction of the grooved tread portions 101 surrounding the raised tread portion 102. This will result in a force $F_S$. As shown, the resulting force $F_R$ acting on the wheel 4', and thus on the vehicle the wheel 4' is attached to, has a component in the direction of said sideward displacement direction.

Figure 6:
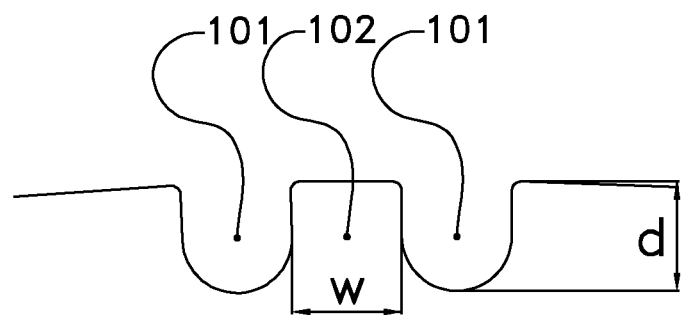
FIG. 6 shows a cross sectional view of the tread pattern.

FIG. 6 schematically shows a cross sectional view of part of the wheel 4' in a direction perpendicular to direction of largest extent of the diagonal tread portions 101. FIG. 6 shows that the diagonal grooved tread portions 101 have a depth d with respect to the raised tread portions 102. The raised tread portions 102 have a width w. So, the closest distance between two adjacent grooved tread portions 101 is equal to w and the height of the raised tread portions 102 is equal to d.

The grooves may have any suitable cross sectional shape, such as rectangular or rounded as shown in FIG. 6. The bottom may be rounded having a radius of 3 mm, providing a groove with a width of 6 mm. The transition from the raised surface to the groove may be rounded having a radius of 0.5 mm.

The groove may also have a shape creating an undercut area into the diagonal raised tread portion 102, providing the diagonal raised tread portion 102 with improved flexibility in a direction perpendicular to the diagonal direction of the grooves 101.

The width w is at least smaller than 3 times the depth (d), preferably smaller than 2 times the depth (d) The width and the depth may be substantially equal to each other. The width w may also be smaller than the depth d.

Such dimensions allow the raised tread portions to be flexible in a direction perpendicular to the diagonal direction of the tread portions. The raised tread portions 102 will deform in this direction upon interaction with the floor, resulting in a reaction force. This reaction force has a component in the sideward direction. This results in a resulting force $F_R$ having a component in the direction of said sideward displacement direction.

The ration between the width w and the depth d should be chosen in dependence on the weight of the vehicle, the flexibility of the outer material of the wheel and the expected force exerted by the displacement of feed.

The tread pattern may be formed by taking a wheel having an outer circumferential surface without a tread pattern and removing material to create grooved tread portions. Removing material may be done by milling. Alternatively the tread pattern may be formed by taking a wheel having an outer circumferential surface without tread pattern and adding material forming raised tread portion.

Of course, alternative embodiments may be conceived, other than the embodiments shown in the figures. For instance, the treads may be asymmetrical treads, having a different tread pattern on the inside of the wheel than on the outside of the wheel and/or may be directional treads, i.e. treads which behave differently in a forward moving direction than in a backward moving direction.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A vehicle for displacing material such as feed, comprising:
a frame with a plurality of wheels having a tread pattern with a plurality of elongate tread portions and grooves;
a motor device operably coupled to at least one of the plurality of wheels for moving the vehicle over a floor in a moving direction; and
a material displacer coupled to the frame, and arranged to displace the material, when the vehicle moves in the moving direction, over the floor towards a first side with respect to said moving direction,
wherein at least a majority of the tread portions is arranged such that the tread portions extend, when in contact with the floor, in a direction that makes a sharp angle with a forward direction opposite said first side.

2. The vehicle according to claim 1, wherein said sharp angle is between 45 and 90°.

3. The vehicle according to claim 1, wherein the tread portions comprise mutually parallel tread portions.

4. The vehicle according to claim 1, wherein the tread portions extend over an entire width of the tread.

5. The vehicle according to claim 1, wherein the grooved tread portions have a depth and the raised tread portions have a width, wherein the width is smaller than 3 times the depth.

6. The vehicle according to claim 1, wherein at least two of the plurality of wheels have a mutually translationally identical tread pattern.

7. The vehicle according to claim 1, wherein the vehicle is an autonomous unmanned vehicle.

8. The vehicle according to claim 1, wherein the material displacer comprises a feed displacer configured to displace feed substantially sidewardly.

9. The vehicle according to claim 1, further comprising:
two wheels that are separately drivable by a separate drive;
a distance determining device configured to determine a distance from the vehicle to a wall portion;
a torque difference adjusting device configured to adjust the torque difference between the wheels; and
a control unit configured to control the vehicle and move the vehicle in a direction of travel.

10. The vehicle according to claim 1, wherein said sharp angle is between 45 and 75°.

11. The vehicle according to claim 1, wherein said sharp angle is 60°.

12. The vehicle according to claim 1, wherein the tread portions comprise straight, linear tread portions.

13. The vehicle according to claim 1, wherein the tread portions consist of straight, linear tread portions.

14. The vehicle according to claim 1, wherein each one of the tread portions extends over an entire width of the wheel.

15. The vehicle according to claim 1, wherein the grooved tread portions have a depth and the raised tread portions have a width, wherein the width is smaller than 2 times the depth.

16. The vehicle according to claim 1, wherein the material displacer comprises a feed displacer configured to displace feed substantially sidewardly, the feed displacer comprising a feed slide or a circular element freely rotatable for frictional drive with the ground and/or the feed.

17. The vehicle according to claim 2, wherein the tread portions comprise mutually parallel tread portions.

18. The vehicle according to claim 1, wherein the tread portions and grooves of the plurality of wheels are configured in such a manner that upon moving of the vehicle in the moving direction, the tread patterns of the plurality of wheels, in interaction with the floor, together generate a force acting on the vehicle having a component in a sideward displacement direction.

19. The vehicle according to claim 1, wherein the tread pattern of the plurality of wheels of the entire vehicle is asymmetrical with respect to the moving direction.

20. The vehicle according to claim 1, wherein the plurality of wheels include a left wheel and a right wheel, and a majority out of all the tread portions of the left wheel and right wheel extend in the same direction that makes the sharp angle with the forward direction opposite said first side.

* * * * *